(12) United States Patent
Murray et al.

(10) Patent No.: US 7,980,613 B2
(45) Date of Patent: Jul. 19, 2011

(54) REAR GARNISH CLIP

(75) Inventors: Sean A. Murray, Galena, OH (US); Lin Lee, Powell, OH (US); Takuji Ohara, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/187,987

(22) Filed: Aug. 7, 2008

(65) Prior Publication Data

US 2010/0032974 A1 Feb. 11, 2010

(51) Int. Cl.
*B60N 99/00* (2006.01)
(52) U.S. Cl. ................... 296/1.08; 296/193.06
(58) Field of Classification Search ................. 296/1.07, 296/1.08, 213, 193.06, 29; 52/716.5–716.7
See application file for complete search history.

(56) References Cited

U.S. PATENT DOCUMENTS

| | | | |
|---|---|---|---|
| 4,765,036 A * | 8/1988 | Iguchi et al. ................. 24/289 |
| 5,142,834 A * | 9/1992 | Laclave et al. ................. 52/208 |
| 5,195,793 A | 3/1993 | Maki |
| 6,102,473 A * | 8/2000 | Steininger et al. ............. 296/209 |
| 6,135,517 A * | 10/2000 | Cordebar ....................... 293/155 |
| 6,276,109 B1 * | 8/2001 | Hingorani et al. ............ 52/716.5 |
| 6,681,543 B2 * | 1/2004 | Nada et al. .................... 52/716.5 |
| 6,901,722 B2 * | 6/2005 | Dextraze et al. ................ 53/399 |
| 7,073,230 B2 | 7/2006 | Boville |
| 7,165,371 B2 | 1/2007 | Yoyasu |
| 7,186,051 B2 * | 3/2007 | Benedetti et al. ............. 403/388 |
| 7,272,873 B2 * | 9/2007 | Nessel et al. ..................... 24/297 |
| 7,354,102 B2 * | 4/2008 | Cave et al. .................... 296/209 |
| 7,364,382 B2 * | 4/2008 | Benedetti et al. ............. 403/388 |
| 7,419,206 B2 * | 9/2008 | Slobodecki et al. ......... 296/97.9 |
| 2004/0067100 A1 | 4/2004 | Sasaki et al. |

FOREIGN PATENT DOCUMENTS

JP 09-226476 9/1997
JP 11-247810 9/1999
* cited by examiner

*Primary Examiner* — Glenn Dayoan
*Assistant Examiner* — Gregory Blankenship
(74) *Attorney, Agent, or Firm* — Rankin Hill & Clark LLP

(57) ABSTRACT

A garnish for a vehicle has an inner surface with at least one planar projection extending therefrom. The projection has at least one opening disposed therein. The opening has two side edges, at least one of which is beveled.

19 Claims, 7 Drawing Sheets

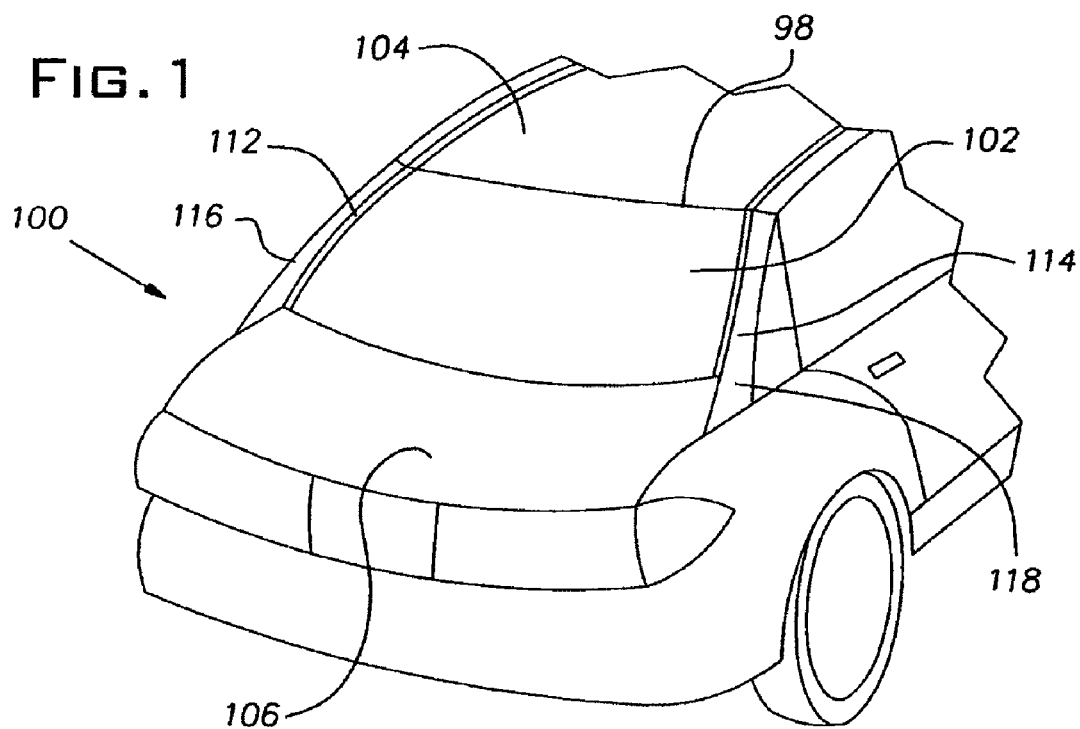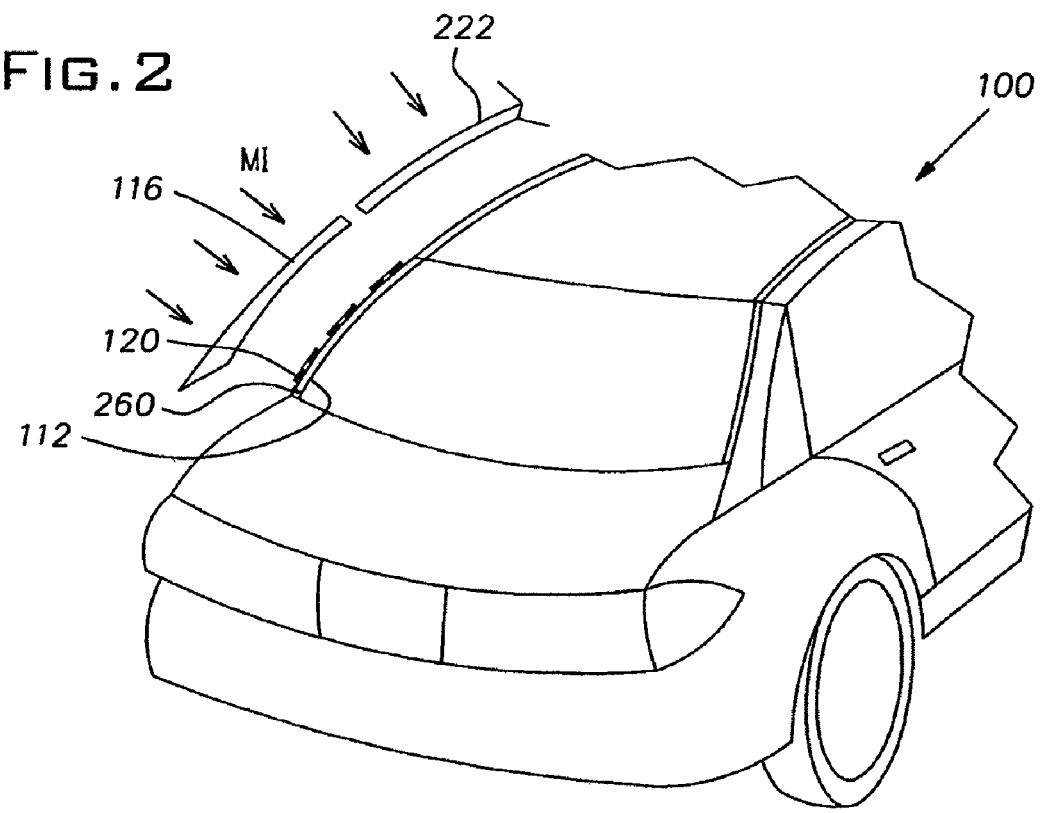

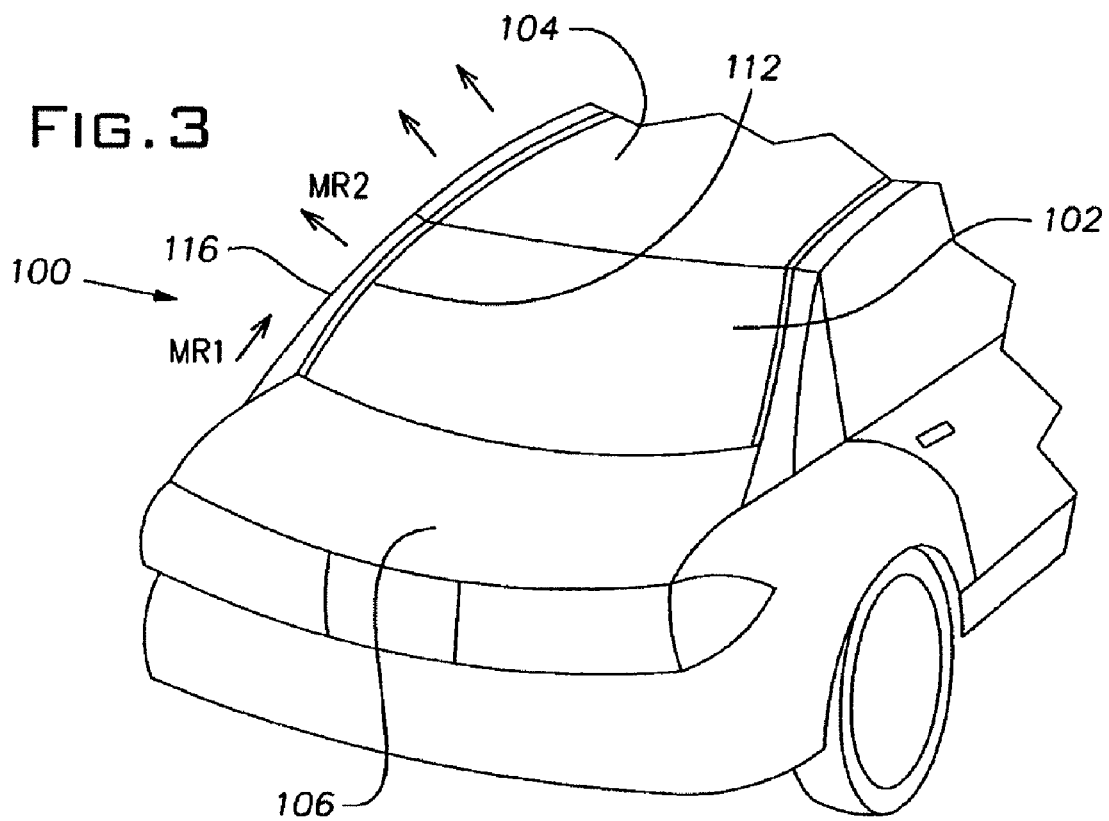

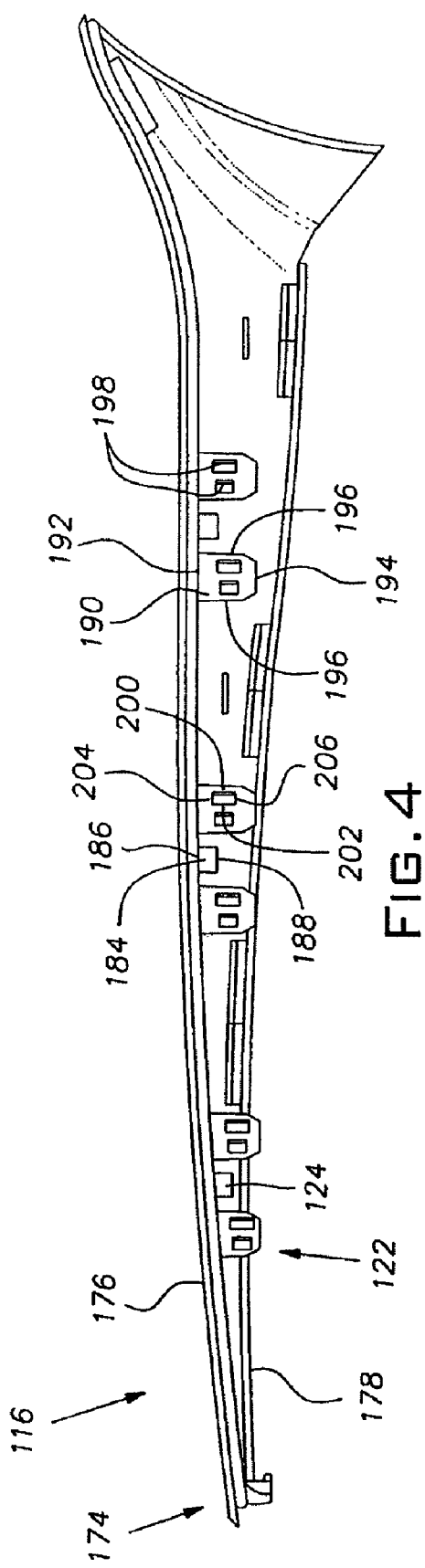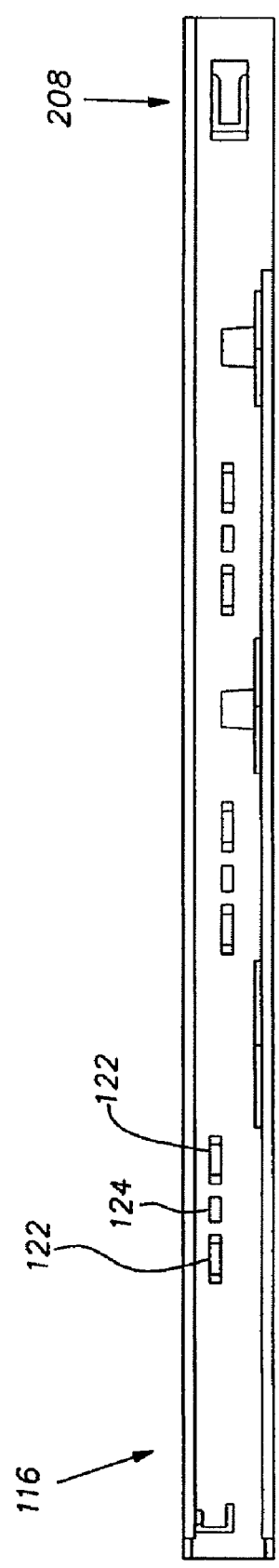

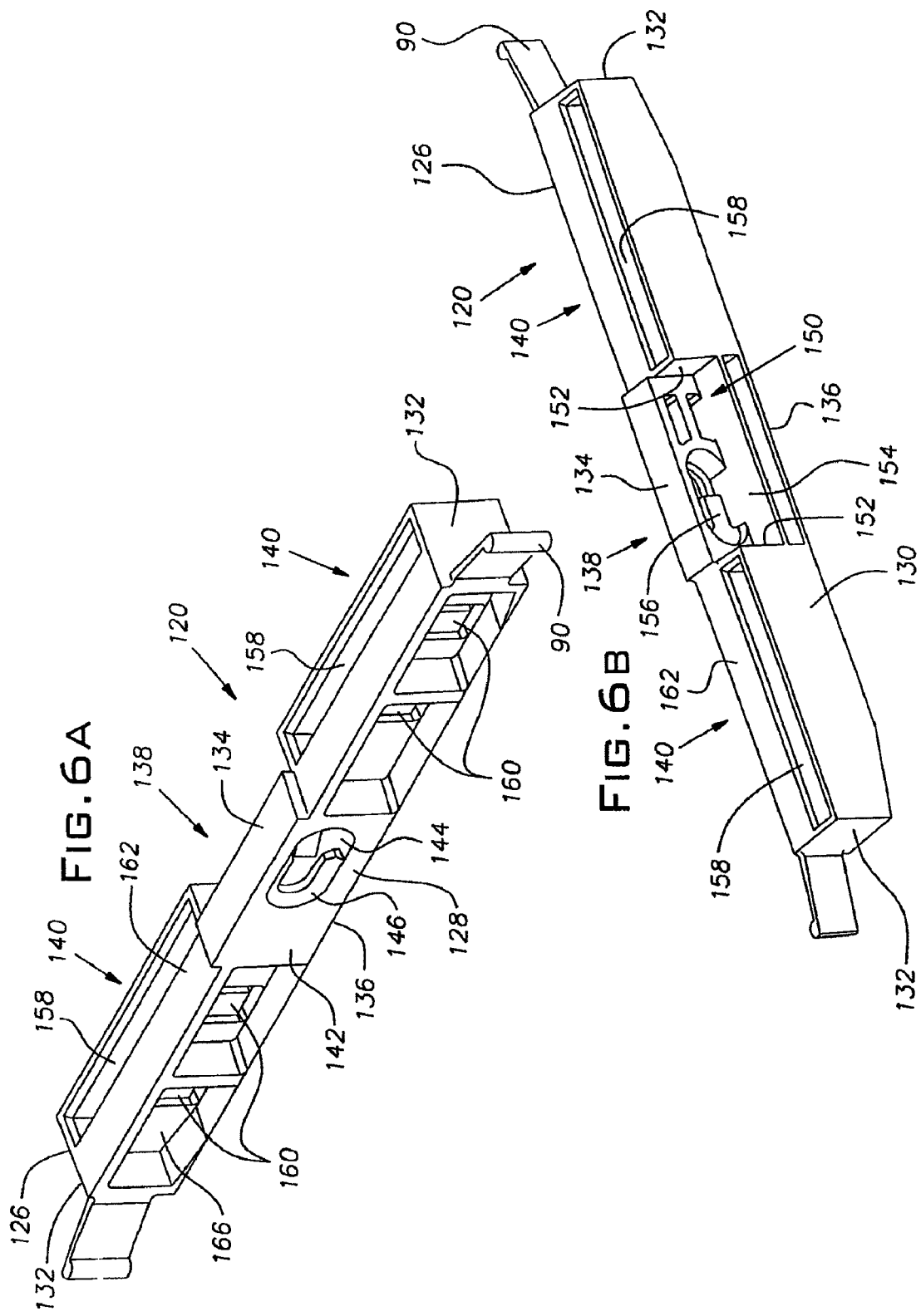

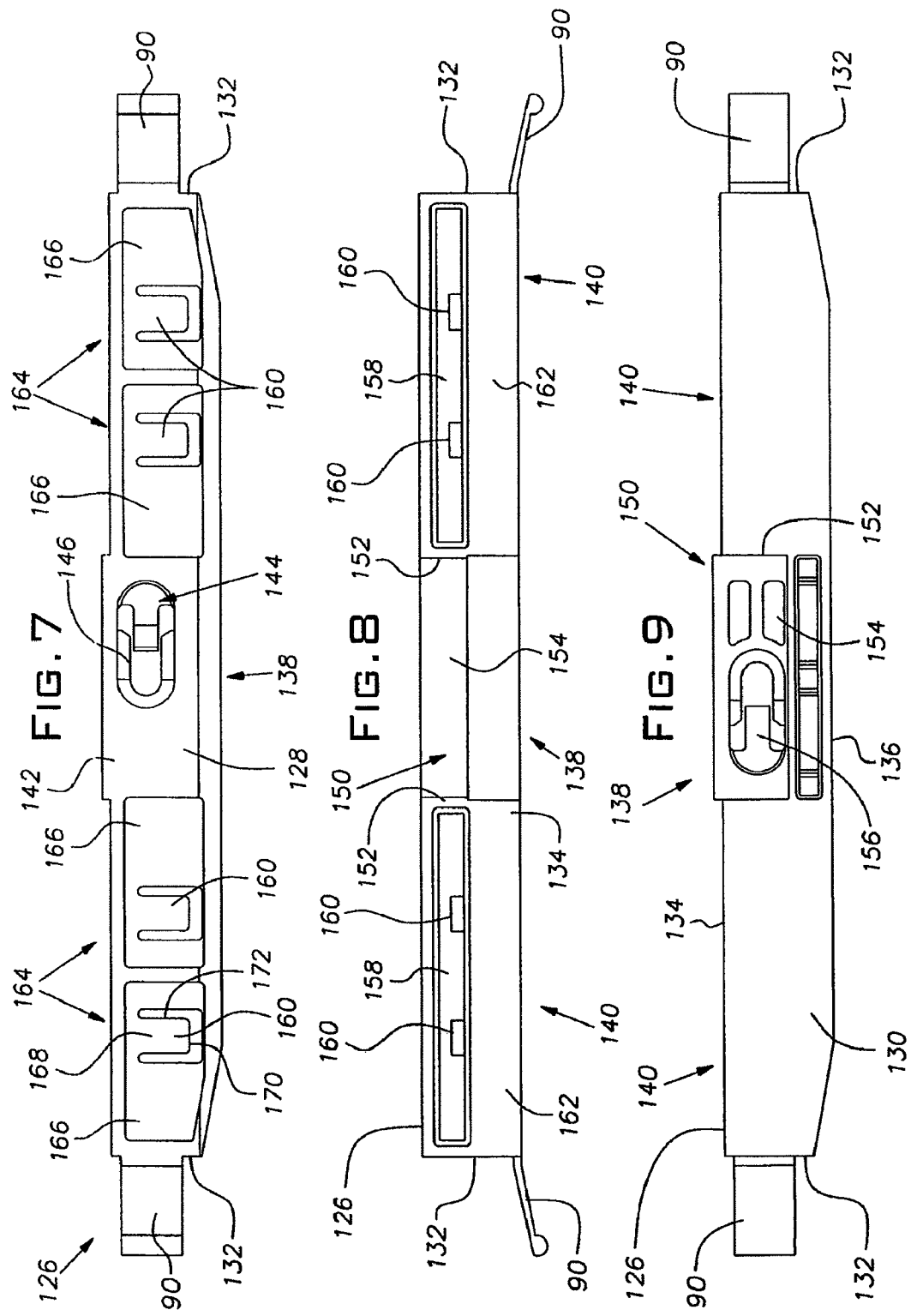

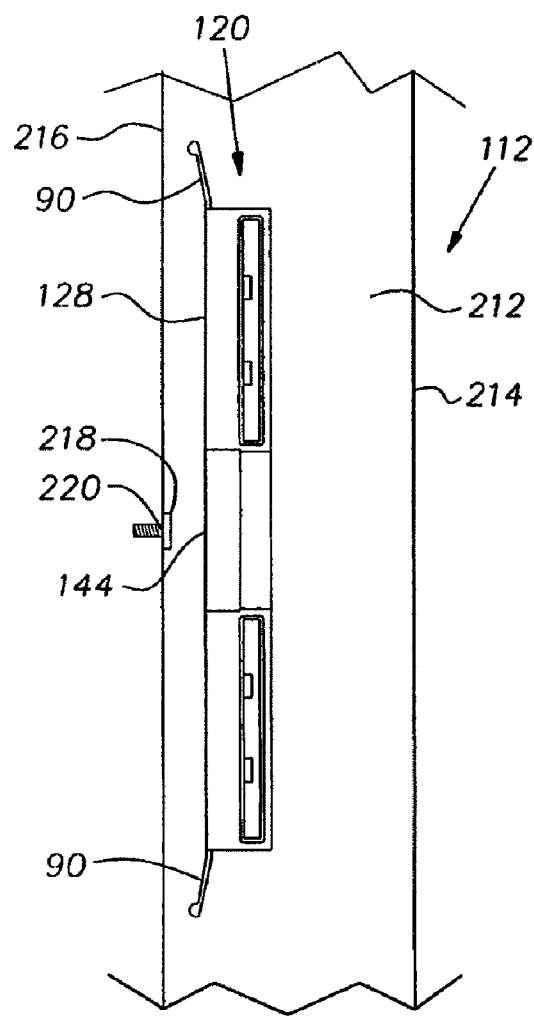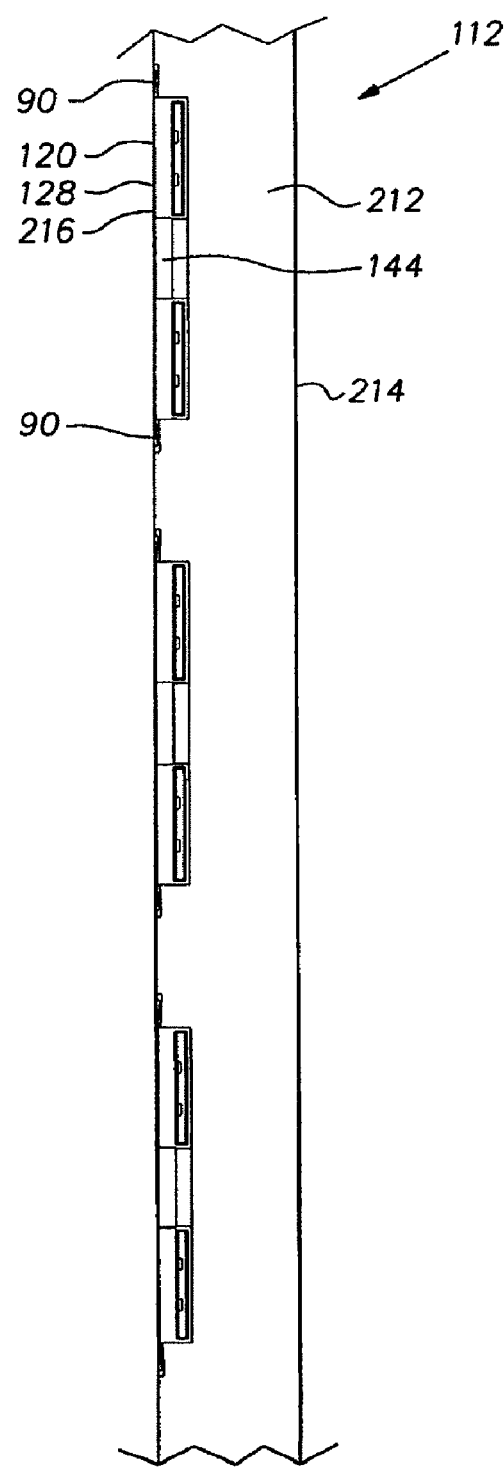

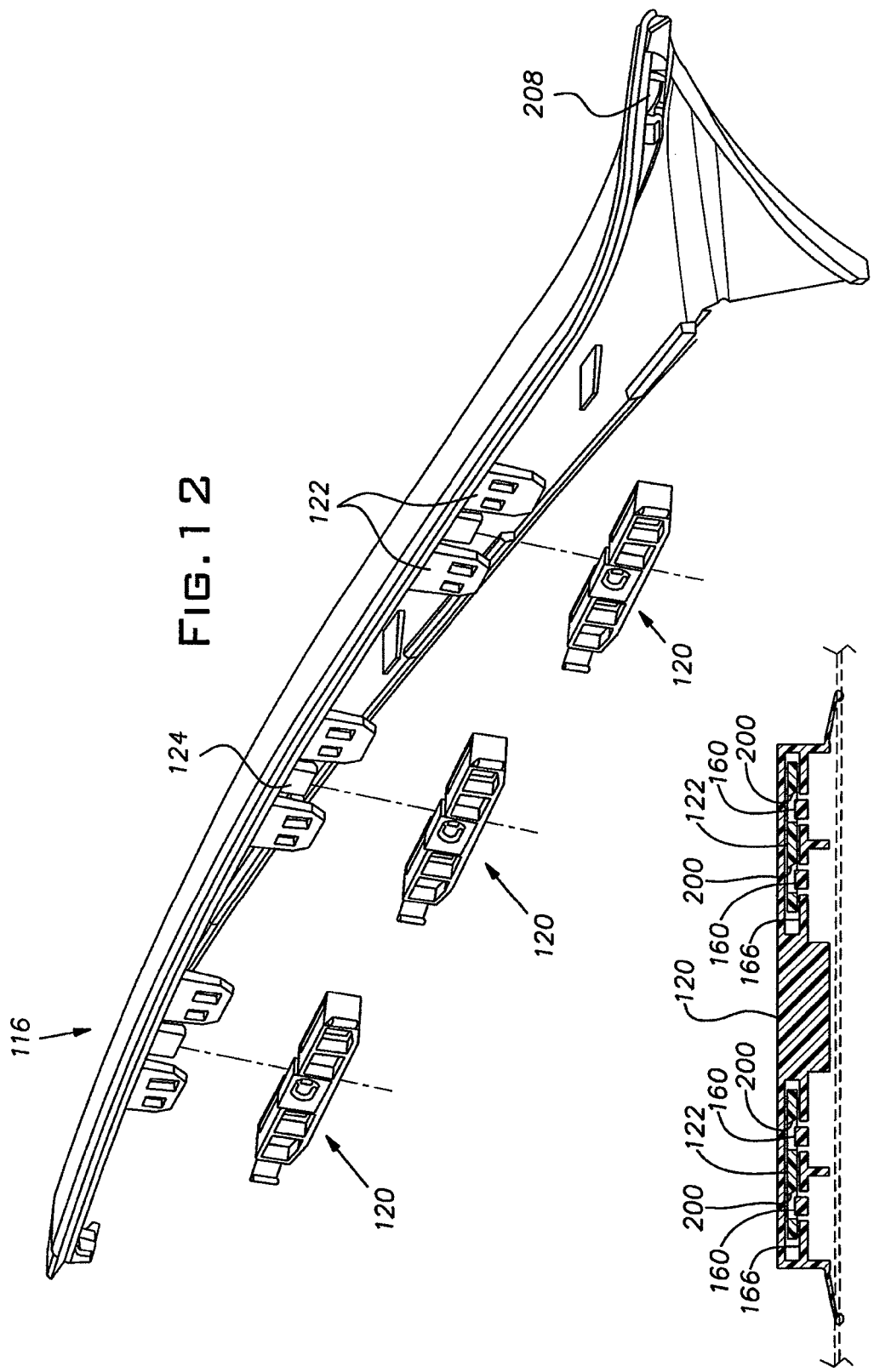

REAR GARNISH CLIP

BACKGROUND OF THE INVENTION

Many garnish components are secured using one or more clips that engage an associated portion of the vehicle body. These clips can be installed with an adhesive, mechanical fastener or by snap fit with another component. With snap-fit clips, the operator can place the garnish component in the required position and press the clip onto the associated portion on the vehicle body until the clip snaps into engagement with the vehicle body. This assembly method allows the operator to attach the garnish component to the vehicle by placing the garnish component in the appropriate position and then applying pressure to the garnish component. Any extraneous steps, such as applying adhesive or securing with a mechanical fastener, are eliminated. The efficiency of the operation is thereby improved.

While the use of such clips has improved assembly efficiency, many drawbacks persist. One primary drawback is that once the garnish component is assembled, removing the garnish component may damage the garnish component or the clips because the clips allow for easy assembly, but do not provide for disassembly. Accordingly, when a garnish component needs to be removed, the clip and/or garnish component need to be replaced.

SUMMARY OF THE INVENTION

According to one aspect, a garnish for a vehicle has an inner surface with at least one planar projection extending therefrom. The projection has at least one opening disposed therein. The opening has two side edges, at least one of which is beveled.

According to another aspect, an assembly for a vehicle includes a component having an outer surface, an inner surface and at least one male member affixed to the inner surface and projecting therefrom. The male member includes at least one engagement opening having side edges, at least one of the side edges being beveled. The assembly also includes at least one clip secured to a vehicle frame, the clip having at least one opening for receiving the male member, and at least one tooth configured to be received in the engagement opening so as to secure the male member to the clip.

According to yet another aspect, a method for engaging a component with a vehicle frame includes the steps of: providing a component having at least one projection having at least one engagement opening with at least one beveled side edge, providing at least one clip having at least one opening and at least one tooth, the clip being attached to the vehicle frame; aligning the component on the vehicle frame such that the projection is aligned with the clip opening; and pressing the component into engagement with the clip by pushing the projection into the opening such that the tooth extends into the engagement opening.

According to still another aspect, a method of disengaging a component from a vehicle frame includes the steps of: providing a component having at least one projection having at least one engagement opening with at least one beveled side edge; providing at least one clip having at least one opening and at least one tooth projecting into the engagement opening, the component being attached to the clip and the clip attached to the vehicle frame; disengaging the component from the clip by laterally moving the component in a direction such that the beveled side edge moves toward the tooth, thereby removing the tooth from the engagement opening; and removing the component by pulling the component in a direction away from the vehicle frame.

BRIEF DESCRIPTION OF THE DRAWINGS

These and further features of the exemplary embodiments will be apparent with reference to the following description and drawings, wherein:

FIG. 1 is a perspective view of a rear portion of a vehicle;

FIG. 2 is a perspective view of the rear portion of the vehicle with a garnish component disassembled;

FIG. 3 is a perspective view of the rear portion of the vehicle with the garnish component assembled;

FIG. 4 illustrates a side view of the garnish;

FIG. 5 illustrates a bottom view of the garnish;

FIG. 6A is a perspective front view of a clip;

FIG. 6B is a perspective rear view of the clip;

FIG. 7 illustrates a front view of the clip;

FIG. 8 illustrates a top view of the clip;

FIG. 9 illustrates a back view of the clip;

FIG. 10 shows the assembly of a vehicle frame and the;

FIG. 11 illustrates the vehicle frame with the clips assembled;

FIG. 12 illustrates the garnish component with the clips assembled;

FIG. 13 illustrates a sectional view of the attachment of the clip to the garnish component.

DETAILED DESCRIPTION OF THE INVENTION

With reference to FIG. 1, a rear portion of a vehicle 100 is illustrated. The vehicle 100 includes a rear windshield 102 attached to the vehicle body via a window frame 98. The window frame 98 connects at a top end to a roof 104 and at a bottom end to a horizontal rear portion 106. The roof 104 is disposed vertically above the horizontal rear portion 106, with the two connected to one another by the rear windshield 102, a left side frame 112, and a right side frame 114. The rear windshield 102, left side frame 112, and right side frame 114 slope from a rear end of the roof 104 to a front end of the horizontal rear end 106. The left and right side frames 112, 114 secure left and right side moldings 116, 118, respectively, via clips 120. The left and right side frames 112, 114 may be identically constructed, but for their disposition on opposite sides of the vehicle 100. To simplify the explanation of the invention, only the left side frame 112 (hereinafter, "frame 112") and left side molding 116 (hereinafter, "molding 116") will be discussed, but it should be understood that the same construction could be used for the right side.

In one exemplary embodiment, the clip 120 allows for easy attachment of the molding 116 to the frame 112. Additionally, the clip 120 allows for simplified detachment of the molding 116 from the frame 112 without damaging the molding 116, the frame 112, or the clip 120. In this vein, the clip 120 is secured to the frame 112 by any means known in the art, such as, but not limited to, an adhesive, mechanical fastener or T-stud arrangement. The clip 120 provides a snap-fit connection wherein the molding 116 is pressed into engagement with the clip 120 and is removably secured to the frame 112. Further, the clip 120 provides a releasing mechanism such that the snap-fit connection between the molding 116 and the frame 112 can be released without damaging the frame 112, the molding 116, or the clip 120.

The clips 120 may engage male members 122 and a stop tab 124 that are integrally formed with the molding 116. The clip 120 is secured to the frame 112. To better secure the molding 116 to the frame 112, plural clips 120 can be used, with the exact number of clips 120 used depending on the desired attachment strength. In one exemplary embodiment, the molding 116 may utilize three clips 120, six male members 122, and three stop tabs 124.

With reference to FIGS. 6A, 6B, and 7-9, the clip 120 has a generally rectangular body 126 with a front side 128, a back side 130, side surfaces 132, a top side 134, and a bottom side 136. Further, the clip body 126 defines a central portion 138 and two end portions 140. The central portion 138 serves to attach the clip 120 to the frame 112 while the end portions 140 secure the molding 116 to the clip 120.

Along the front side 128 of the clip body 126, the central portion 138 may have a planar face 142 that defines an oval shaped opening 144. The opening 144 has a major axis that extends laterally across the face 142 of the central portion 138. Further, the opening 144 includes a taper portion 146 that reduces the open area of the opening 144 so that the opening 144, at one end, is open over the full area of the oval, and at the opposing end has a reduced area opening. The opening 144 is thereby shaped and adapted to receive a head of a T-stud 218 to mount the clip 120 to the frame 112. The taper 146 supports the mounting of the clip body 126 to the frame 112 through the T-stud 218, as will be described below.

Along the back side 130 of the clip body 126, the central portion 138 provides a recess 150 defined by sidewalls 152 and a bottom wall 154. The bottom wall 154 may extend the full lateral length of the central portion 138, with the sidewalls 152 extending perpendicularly upwards from ends of the bottom wall 154. The bottom wall 154 may have a width that is approximately half of the width of the clip body 126 as viewed from the top side 134, as shown in FIG. 8. Additionally, the central portion 138 of the back side 130 of the clip body 126 provides a securing tab 156 that extends approximately half way from the narrow end of the opening 144 toward the wide end of the opening 144. The top surface of the central portion 138 is a flat, planar surface.

The end portions 140 of the clip body 126 are disposed on either side of the central portion 138, and may be substantially identical to one another. Generally, the end portion 140 defines a vertically oriented opening 158 and a pair of peninsular teeth 160 adapted to secure the male member 122 to the clip 120, as will be described in detail below.

When viewed from the top side 134, as in FIG. 8, the end portion 140 is laterally split along the width of the clip body 126. The end portion 140 defines the opening 158 adjacent to the back side 130 of the clip body 126. The opening 158 is rectangular in shape, and extends from an adjacent end of the clip body 126 to the central portion 138, such that the opening 158 is partially defined by a central portion sidewall 152. Further, the teeth 160 protrude into the opening 158 at a downward angle, as will be described in further detail below. The back side 130 of the end portion 140 provides a planar face 162 that extends from the end of the clip body 126 to the central portion recess 150 (FIG. 6B, 9).

The front side 128 of the end portion 140 is shown in FIGS. 6A and 7. The front side 128 of each end portion 140 defines two recessed compartments 164. Each compartment 164, along an inner wall 166, provides one peninsular tooth 160. The peninsular teeth 160 have a proximal connected upper end 168 and a free distal lower end 170, as well as teeth sides 172 that are spaced from the inner wall 166. The teeth 160 may be sloped so as to project into the opening 158 such that the free distal end 170 projects into the opening 158 while the connected proximal end 168 is in-line with the inner wall 166.

Additionally, the clip 120 may include two wings 90 extending outwardly from each of the end portions 140. The wings 90 extend from the front side 128 of the clip body 126, protrude outwardly, and are slightly bowed so as to project slightly forward from the front side 128 of the clip body 128. As will be explained in further detail below, the wings 90 provide a spring mechanism that facilitates the attachment of the clip to the frame 112.

The clip 120 is secured to the frame 112, as will be described in further detail below. Once secured to the frame 112, the clip 120 allows the molding 116 to be secured to the frame 112. The molding 116 has a body 174 with an outer surface 176 and an inner surface 178. The shape of the outer surface 176 changes to accommodate the particular garnish component that is to be attached to the vehicle body. In one exemplary embodiment, the garnish component is a rear windshield molding 116, and is therefore an elongated member covering a rounded corner. To cooperate with the clip 120, the male members 122 and stop tabs 124 extend from the inner surface 178.

The male members 122 are adapted so that each male member 122 may engage one end portion 140 of each clip 120. In one exemplary embodiment, two male members 122 may engage each clip 120. In order for each of the two male members 122 to engage the corresponding end portion 140, the male members 122 are spaced from one another with a stop tab 124 disposed therebetween. The male members 122 are equally spaced from the stop tab 124 a distance such that the male members 122 can enter the clip body opening 158 and engage the teeth 160.

The male members 122 project from the inner surface 178 of the molding 116 in a generally perpendicular manner. The male members 122 may be identical to one another.

With reference to FIGS. 4 and 5, the male member 122 is a rectangular planar member having a face 190, a proximal edge 192, a free distal edge 194, and side edges 196. While the face 190 is generally rectangular, the corners formed by the intersection of the free distal edge 194 and the side edges 196 may be rounded, as shown in FIG. 4. The face 190 defines one or more rectangular teeth engaging openings 198. The openings 198 are spaced from the proximal edge 192, the distal edge 194, and the side edges 196. The openings 198 are defined by a beveled or sloped rear edge 200, a front edge 202, a top edge 204, and a bottom edge 206. The beveled rear edge 200 is disposed toward a rear of the molding 116 when the molding 116 is attached to the vehicle 100. The front edge 202 is disposed toward a front of the molding 116 when the molding 116 is attached to the vehicle 100. The top edge 204 is the edge adjacent to the proximal edge 192, and the bottom edge 206 is adjacent to the distal edge 194.

Each male member 122 may be received in one of the clip body openings 158 and may engage teeth 160 of the clip 120 through each of the openings 198 defined therein. In this regard, the length of the male member 122, defined by the distance between the side edges 196, is less than a length of the clip body opening 158, defined by the distance from the end of the clip body 126 to the nearest central portion sidewall 152. Further, a width of the male member 122 is less than a width of the opening 158, however the width of the male member 122 is large enough so that the male member free distal edge 194 must contact the teeth 160 as the male member 122 is received in the clip body opening 158.

The teeth 160 of the clip 120 are configured so as to protrude through the male member openings 198, and thereby secure the molding 116 to the frame 112 through the engagement with the clip 120. In this regard, the male member openings 198 define an open area larger than the surface area of the teeth 160. As such, the protruding loose ends 170 of the teeth 160, when the male member 122 is fully inserted into the opening 158, protrude into the male member openings 198.

In the illustrated and exemplary embodiment, the two openings 198 on each male member 122 have different sizes. Notably, the opening 198 disposed toward the front of the molding 116 is larger than the opening 198 disposed toward the rear of the molding 116. Alternatively, the openings 198 can all have the same size.

Further, as mentioned, the openings 198 are defined by a beveled rear edge 200. The beveled rear edge 200 has an angle (see FIG. 13) that serves as a cam surface to engage and deform the teeth 160 so as to allow the teeth 160 to be removed from the male member openings 198 by laterally moving or sliding the male members 198 in a forward direction relative to the vehicle 100 by moving or sliding the molding 116. When the male members 122 are moved in a forward direction toward the front of the vehicle 100, the teeth 160 ride over the beveled rear edge 200 and move out of the opening 198 to rest flush against the male member's face 190. When the teeth 160 are removed from the openings 198, the molding 116 can be removed from the frame 112 as the male members 122 are no longer engaged to the clip 120.

In addition to the male members 122, the stop tab 124 cooperates with the clip 120 to allow the molding 116 to be set in a desired position relative to the frame 112. Further, the stop tab 124 serves as a block to prevent undesired lateral movement of the molding 116 relative to the frame 112.

The stop tab 124 is a planar member having a relatively thin width and a broad face 184. The stop tab 124 is integrated with the molding 116 along a proximal edge 186, and has a free distal edge 188. The free distal edge 188 is spaced from the integrated proximal edge 186 by the stop tab broad face 184 a distance such that, when the clip 120 engages the pair of male members 122 and the stop tab 124, the free distal edge 188 is close to, or in engagement with, the bottom wall 154 of the recess 150 formed in the central portion 138 of the back side 130 of the clip body 126. As will be explained below, the stop tab 124 is used to position the molding 116 relative to the frame 112, and serves as a blocker to prevent movement of the molding 116 in a rearward direction. Further, the stop tab 124 has a length that is less than the length of the clip body recess bottom wall 154 such that the stop tab 124 fits between the recess sidewalls 152.

With further reference to FIG. 4, it is noted that the molding outer surface 176 is slightly curved. Correspondingly, the molding inner surface 178 is similarly curved. The frame 112 wherein the molding 116 will be secured via the clip 120 is generally linear. Thus, to attach the molding 116 to the clip 120 and the frame 112, the stop tabs 124 are used to regulate the position of the molding 116 relative to the clip 120 and frame 112 so as to allow the curved molding 116 to be secured to the linear frame 112. More specifically, the free distal edge 188 of the stop tab 124 contacts the recess bottom wall 154 of the clip body 126 and limits movement of the molding 116 toward the frame 112. In this regard, the free distal edges 188 of the three stop tabs 124 are arranged so as to define a plane corresponding to the desired connection depth and angle with the clip 120 and the frame 112. The plane defined by the stop tabs 124 is linear so as to allow the curved molding 116 to be secured to the linear frame 112.

In addition to using the clips 120 to secure the molding 116 to the frame 112, other mechanisms are utilized to ensure a firm attachment. Particularly, the molding 116 is adapted to be further secured via mechanical fasteners and interaction with other garnish components.

With further reference to FIGS. 4 and 5, the molding 116 includes a T-stud opening 208 disposed at a rear end of the molding 116. The opening 208 has a wide portion disposed toward the rear of the molding 116, with the opening 208 being tapered into a narrow portion toward the front of the molding 116. As such, a T-stud 260 can be received in the narrow portion to secure the molding 116, and the molding 116 can be moved laterally toward the front of the vehicle 100, placing the T-stud 260 in the wide portion, and thereby releasing the molding 116 from being secured to the frame 112 by the T-stud 260.

As the components of the clip 120 and the molding 116 have been explained, the assembly of the molding 116 to the frame 112 will now be described. The first step in the assembly process is securing the clip 120 to the frame 112. The frame 112 is part of the vehicle body and extends along the edge of the rear windshield 102. As shown in FIGS. 10 and 11, the frame 112 includes a recess 212 with an inward wall 214 and an outward wall 216. The clip 120 attaches to the outward wall 216 through a T-stud 218 that engages the T-stud opening 144 in the clip 120, the T-stud 218 being secured in an engagement hole 220 defined in the outward wall 216.

The clip 120 may be placed so that the front side 128 is flush with the outward wall 216, with the T-stud opening 144 of the clip 120 being disposed over the T-stud 218 attached to the outward wall 162. The wide portion of the T-stud opening 144 should be over the T-stud 218 such that the T-stud 218 protrudes through the T-stud opening 144. The clip 120 is then laterally moved such that the T-stud 218 is received in the narrow portion of the opening 144 caused by the taper 146. The clip 120 is thereby secured to the outward wall 216 of the frame 112. FIG. 11 shows the frame opening 212 with all three clips 120 secured thereto.

It is noted that the wings 90 may provide a spring force that will gently urge the clip body 126 away from the outward wall 216. Thus, the spring force of the wings 90 must be overcome to initially set the clip 120 on the frame outward wall 216. Once the clip 120 is set, the spring force provided by the wings 90 pushes the clip body 126 away from the outward wall 216, and helps retain the clip 120 to the T-stud 218.

Once the clips 120 are attached to the frame 112, the molding 116 is secured to the frame 112 by engaging the male members 122 with the clips 120. With reference to FIGS. 2 and 12, the attachment of the molding 116 to the frame 112 is shown. First, the molding T-stud opening 208 is placed over the T-stud 260 secured to the frame 112. The molding 116 is then moved in a rearward direction relative to the vehicle 100 so as to place the T-stud 260 in the narrow portion of the opening 208. The molding 116 is then positioned so that the male members 122 projecting from the underside of the molding 116 are aligned with the clip body openings 158 on the top side 134 of the clips 120. The molding 116 is then pressed in a direction of the arrows MI, causing the male members 122 to enter the clip body openings 158. As the male members' free distal edges 194 reach the teeth 160, the teeth 160 are pushed so as to be forced out of the clip body opening 158. Once the free distal end 170 of the teeth 160 reach the engagement openings 198 formed in the male member face 190, the teeth 160 snap back into the opening 158, through the male member openings 198, thereby securing the male members 122 to the clips 120. Accordingly, the molding 116 is secured to the frame 112. FIG. 12 shows an exploded view of the engagement of the clips 120 to the male members 122, absent the frame 112 (the attachment is more readily represented without interference from the frame 112).

Once the molding 116 is secured to the frame 112, a roof drip molding 222 is attached along a side edge of the roof 104, such that a rear end of the roof drip molding 222 covers a front end of the molding 116. Accordingly, the roof drip molding 222 blocks forward lateral movement of the molding 116. Thus, in cooperation with the T-stud 260, the molding 116 is prevented from moving in either lateral direction.

A benefit of the clip 120 is that the molding 116 can be removed from the frame 112 without damaging any of the components involved. FIG. 3 shows the process of removing the molding 116 from the frame 112. Initially, as the molding 116 is restricted from forward lateral movement by the roof drip molding 222, the roof drip molding 222 must be removed. Then, the molding 116 is moved in the forward lateral direction, as denoted by the arrow MR1. The forward movement of the molding 116 will cause the male members 122 to disengage from the clips 120. In addition to disengaging the male members 122 from the clips 120, the forward movement also disengages the T-stud 260 from the T-stud opening 208. Following the forward movement, the molding 116 is free and is removed by pulling in the direction of the arrow MR2.

More specifically, with reference to FIG. 13, disengagement of the male members 122 from the clips 120 upon forward movement of the molding 116 is explained. FIG. 13 shows the teeth 160 of the clip 120 received in the engagement openings 198 of the male member 122. As mentioned above, the rear edge 200 of the engagement openings 198 is beveled. Thus, when the molding 116 is moved in a forward lateral direction, denoted by the arrow MR1 in FIG. 13, the beveled rear edges 200 of the male member 122 cammingly force the teeth 160 of the clip 120 out of the clip body opening 158 and the male member openings 198. Thus, the teeth 160 are pressed against the male member face 190, and are no longer engaged with the engagement openings 198. The molding 116 can now be removed by pulling in the direction of MR2, without significant resistance from the clip 120.

The description with reference to the figures is intended to simplify the explanation of the exemplary embodiments and is not meant to limit the scope in anyway. While the exemplary embodiments have been described with particularity herein, it is considered apparent that the exemplary embodiments are capable of numerous modifications, substitutions, and rearrangement of parts without departing from the scope and spirit of the application. Therefore, the exemplary embodiments are not to be limited to any particular embodiments described hereinbefore, but rather only defined by the claims appended hereto.

Particularly, the clip 120 is amenable for use with any interior or exterior garnish component. However, as different garnish components have different shapes, and attach to portions of the vehicle frame having different shapes, the precise form the clip takes in use with differing garnish components can vary. Further, the number of male and female members used to secure the garnish components to the frame can vary depending on the component and the desired strength of the attachment. Further still, the components of the clip 120 can be switched relative to one another, such that the female member can be attached to the garnish component and the male member can be affixed to the frame.

What is claimed is:

1. A garnish for a vehicle, comprising:
   an inner surface having at least one planar projection extending therefrom, said planar projection having a face enclosing a perimeter of at least one opening defined through said planar projection face, said opening defined by two perpendicular side edges extending in a direction substantially perpendicular to the inner surface of the garnish at a position on the inner surface of the garnish from which the planar projection extends, and two parallel side edges extending in a direction substantially parallel to the inner surface of the garnish at a position on the inner surface of the garnish from which the planar projection extends,
   wherein only one of the two perpendicular side edges is beveled.

2. The garnish according to claim 1, wherein said planar projection face includes a flat portion adjacent said opening.

3. The garnish according to claim 2, wherein a second opening is defined through said planar projection face and said flat portion is disposed between said openings.

4. The garnish according to claim 1, wherein a plurality of planar projections extend from said inner surface.

5. The garnish according to claim 4, wherein each of said planar projections includes a plurality of openings, each opening having a beveled side edge.

6. The garnish according to claim 5, wherein a flat portion is disposed between each of said openings.

7. The garnish according to claim 1, wherein said planar projection includes a plurality of openings.

8. A garnish for a vehicle, comprising:
   an inner surface having a plurality of planar projections extending therefrom, each of said planar projections having a face enclosing a perimeter of a plurality of openings defined through said planar projection face with a flat portion disposed between each of said openings, said openings each having two side edges extending in a direction substantially perpendicular to the inner surface of the garnish at a position on the inner surface of the garnish from which the planar projection extends,
   wherein at least one of the two side edges of each of the plurality of openings is beveled, and
   wherein at least one of said openings defined through each said planar projection is larger than the rest of said openings defined through said planar projection.

9. The garnish according to claim 7, wherein each opening has a beveled side edge.

10. An assembly for a vehicle, comprising:
    a component having an outer surface and an inner surface, said component including at least one male member affixed to said inner surface of the component and projecting therefrom, said male member having at least one engagement opening formed therethrough, said engagement opening defined by opposed side edges, at least one of said side edges being beveled; and
    at least one clip secured to a vehicle frame, said clip having at least one opening defined by an enclosed perimeter for receiving and enclosing said male member, and at least one tooth configured to be received in said engagement opening so as to secure said male member to said clip.

11. The assembly according to claim 10, wherein said clip includes a central portion disposed between two end portions, wherein at least one tooth is provided in each of said end portions.

12. The assembly according to claim 10, wherein said male member includes a flat portion adjacent said engagement opening.

13. An assembly for a vehicle, comprising:
    a component having an outer surface and an inner surface, said component including at least one male member affixed to said inner surface of the component and projecting therefrom, said male member having at least one engagement opening having side edges, at least one of said side edges being beveled; and
    at least one clip secured to a vehicle frame, said clip having at least one opening for receiving said male member, and at least one tooth configured to be received in said engagement opening so as to secure said male member to said clip, wherein said clip includes a central portion disposed between two end portions, at least one tooth is provided in each of said end portions, and said central portion of said clip provides a T-stud opening on a face opposed to a tooth providing face, said T-stud opening configured to receive a T-stud to selectively secure said clip to said vehicle frame.

14. The assembly according to claim 13, wherein said central portion of said clip provides a ledge on a face opposed to a tooth providing face and said component further includes a stop tab projection adjacent to said male member, wherein said stop tab projection is received in said ledge so as to limit a lateral movement of said male member relative to said clip in a direction opposed to the direction of disengagement, and so that said stop tab projection positions said component relative to said clip and said vehicle frame.

15. An assembly for a vehicle, comprising:
a component having an outer surface and an inner surface, said component including at least one male member affixed to said inner surface of the component and projecting therefrom, said male member having at least one engagement opening defined by two perpendicular side edges extending in a direction substantially perpendicular to the inner surface of the component at a position on the inner surface of the component from which the male member extends, and two parallel side edges extending in a direction substantially parallel to the inner surface of the component at a position on the inner surface of the component from which the male member extends, wherein only one of said perpendicular side edges is beveled; and at least one clip secured to a vehicle frame, said clip having at least one opening for receiving said male member, and at least one tooth configured to be received in said engagement opening so as to secure said male member to said clip, wherein said male member includes a plurality of engagement openings, wherein each of said engagement openings are beveled.

16. The assembly according to claim 15, wherein said clip includes a tooth that engages each said engagement opening of said male member.

17. An assembly for a vehicle, comprising:
a component having an outer surface and an inner surface, said component including at least one male member affixed to said inner surface of the component and projecting therefrom, said male member having at least one engagement opening defined by two perpendicular side edges extending in a direction substantially perpendicular to the inner surface of the component at a position on the inner surface of the component from which the male member extends, and two parallel side edges extending in a direction substantially parallel to the inner surface of the component at a position on the inner surface of the component from which the male member extends, wherein only one of said perpendicular side edges is beveled; and at least one clip secured to a vehicle frame, said clip having at least one opening for receiving said male member, and at least one tooth configured to be received in said engagement opening so as to secure said male member to said clip, wherein said component includes a plurality of spaced apart male members each having a plurality of engagement openings and wherein each male member engages a different clip.

18. The assembly according to claim 17, wherein each clip includes a plurality of teeth that engage each said engagement opening of each male member.

19. A method of disengaging a component from a vehicle frame, comprising the steps of:
providing a component with at least one projection, said projection having at least one engagement opening defined therethrough, and said engagement opening having at least one beveled side edge;

providing at least one clip having at least one opening and at least one tooth projecting into said engagement opening, said component being attached to said clip and said clip attached to said vehicle frame;

disengaging said component from said clip by laterally moving said component in a direction such that said beveled side edge moves toward said tooth, thereby removing said tooth from said engagement opening; and removing said component by pulling said component in a direction away from said vehicle frame.

* * * * *